(12) United States Patent
Ogles et al.

(10) Patent No.: US 7,014,211 B2
(45) Date of Patent: Mar. 21, 2006

(54) BRACKET AND MUD-FLAP ASSEMBLY

(76) Inventors: Daniel R. Ogles, 124 E. 20th St., Owensboro, KY (US) 42303; Patti M. Ogles, 124 E. 20th St., Owensboro, KY (US) 42303

( * ) Notice: Subject to any disclaimer, the term of this patent is extended or adjusted under 35 U.S.C. 154(b) by 102 days.

(21) Appl. No.: 10/886,536

(22) Filed: Jul. 9, 2004

(65) Prior Publication Data

US 2006/0006636 A1    Jan. 12, 2006

(51) Int. Cl.
    *B62B 9/14* (2006.01)
(52) U.S. Cl. .................. 280/847; 280/154; 280/848
(58) Field of Classification Search .......... 280/847, 280/848, 849, 851, 154, 159, 155, 152.05
    See application file for complete search history.

(56) References Cited

U.S. PATENT DOCUMENTS

| | | | | |
|---|---|---|---|---|
| 2,077,818 A | * | 4/1937 | Zaiger ................. | 280/851 |
| 3,219,363 A | * | 11/1965 | Adrian et al. ........ | 280/851 |
| 3,700,260 A | * | 10/1972 | Moore et al. ........ | 280/851 |
| 4,165,092 A | | 8/1979 | Herlein ............... | 280/154.5 R |
| 4,326,727 A | | 4/1982 | Rock .................. | 280/154.5 R |
| 5,044,667 A | | 9/1991 | Manning ............. | 280/851 |
| 5,915,708 A | | 6/1999 | Silva .................. | 280/154 |
| 5,967,553 A | | 10/1999 | Cominsky ........... | 280/847 |
| 6,029,999 A | * | 2/2000 | O'Day ................ | 280/851 |
| 6,116,628 A | | 9/2000 | Adrian ................ | 280/154 |
| 6,135,502 A | | 10/2000 | Howe et al. ......... | 280/847 |
| 6,186,527 B1 | | 2/2001 | Monhollen et al. .. | 280/154 |
| 6,443,492 B1 | | 9/2002 | Barr et al. ........... | 280/851 |
| 2002/0043797 A1 | | 4/2002 | Cicansky ............. | 280/847 |
| 2002/0185853 A1 | | 12/2002 | Gaudet ............... | 280/847 |

FOREIGN PATENT DOCUMENTS

| | | |
|---|---|---|
| DE | 3644394 | 7/1988 |
| EP | 0791526 | 8/1997 |
| WO | WO 97/24249 | 7/1997 |

* cited by examiner

*Primary Examiner*—Christopher Ellis
*Assistant Examiner*—Brian Swenson
(74) *Attorney, Agent, or Firm*—Richard C. Litman

(57) ABSTRACT

A bracket and mud flap assembly for vehicles and heavy equipment with a generally planar rectangular backing, a perpendicular flange attached to and extending across the top edge of the generally planar rectangular backing and a bracket that is below the area of the top edge and having two ends, the bracket being triangular in cross-section and being raised on each end of the bracket forming a slot across the generally planar rectangular backing and the bracket. The generally planar and rectangular mud-flap itself has a raised triangle-shaped protrusion running across its width and can be pulled between and through the front facing of the generally planar and rectangular backing and the bracket until the raised triangle-shaped protrusion is received in the slot.

12 Claims, 4 Drawing Sheets

BRACKET AND MUD-FLAP ASSEMBLY

BACKGROUND OF THE INVENTION

1. Field of the Invention

The present invention relates to a mud-flap assembly for vehicles and heavy equipment.

2. Description of the Related Art

Mud-flaps can be installed on large tractor-trailers, mid-sized trucks and even smaller trucks and are important to keep flying debris from coming off of any tires. There are a number of different ways that these mud-flaps can be attached and secured to the wheel-wells of these types of vehicles. These mud-flaps and mud-flap assemblies are outlined and reflected in the related art.

United States Patent Application Publication Number 2002/0043797 published on Apr. 18, 2002, outlines the use of a mud-flap for a vehicle with a panel member of rubber having a top mounting end for securement within the wheel-well of a vehicle, a bottom free end having a metallic accent plate supported thereon and respective inner and outer sides extending between the ends of the panel member.

United States Patent Application Publication Number 2002/0185853 published on Dec. 12, 2002, outlines the use of an adjustable mud-flap holder with a flap rod with a first attachment arm extended orthogonally for attachment to a first vehicle rod and a second attachment arm extended orthogonally for attachment to a second vehicle rod. The first attachment arm and the second attachment arm have insert projections that are disposed oppositely for insertion into vehicle-rod apertures for fastening the mud-flap holder to a vehicle aft of rear wheels of the vehicle predeterminedly.

U.S. Pat. No. 4,165,092 issued to Herlein on Aug. 21, 1979, outlines the use of a mud-flap mounting bracket that mounts a mud-flap onto a truck frame. A mud-flap assembly has a seat member, a faceplate rotatably seated against the seat member, and an arm attached to one end thereof to the faceplate. A tension spring has one end connected to the arm and another end connected to a chain, which is in turn attached to the seat member through a U-bolt for retaining the faceplate seated against the seat member.

U.S. Pat. No. 4,326,727 issued to Rock on Apr. 27, 1982, outlines the use of a mudguard assembly for mounting on the rear portion of a vehicle behind its rear wheel. The mudguard assembly has a bracket unit, fastened to the vehicle chassis, which bifurcates downwardly into resilient clamping legs, defining hollow space therewithin a horizontal slot extending between and along their entire lower edge portions.

U.S. Pat. No. 5,044,667 issued to Manning on Sep. 3, 1991, outlines a mud-flap, which can be easily installed and removed from its mounting bracket. The mud-flap is substantially planar in form with a predetermined thickness. The mud-flap has a peripheral edge whose cross-section is larger than the predetermined thickness of the mud-flap. The mounting bracket includes a bracket body from which two flanges extend downwardly. The flanges converge towards one another at their lower ends, forming a slot therebetween.

U.S. Pat. No. 5,915,708 issued to Silva on Jun. 29, 1999, outlines a mud-flap mount for releasably mounting mud-flaps to vehicles, including automobiles, trucks, trailers and the like, to prevent damage to the mounting system, vehicle or mud-flap when excessive downward force is exerted on the mud-flap. The mud-flap mount has a planar member that connects to and extends downward from the angle bracket found under most vehicles. A shaped member attaches to the planar member, forming a cavity between the planar member and the shaped member.

U.S. Pat. No. 5,967,553 issued to Cominsky on Oct. 19, 1999, outlines a mud-flap device for attachment to the traverse, rearward facing support frame of a truck. The retainer device has a spring-biased bracket constructed as a unitary, stainless steel piece that incorporates releasability of the mud-flap without destruction thereof, if the mud-flap is pulled under a truck tire or is torn away by similar exceptional forces.

U.S. Pat. No. 6,116,628 issued to Adrian on Sep. 12, 2000, outlines a mud-flap holder for mounting on the rear portion of a vehicle behind its rear wheels, wherein the mud-flap is held between the back-plate of the holder and a pivotally mounted jaw-cover by spring-loaded tension. The mud-flap is inserted in the holder by first opening the jaw-cover and back-plate of the holder, and releasing the lever so that the jaw-cover closes, securing the mud-flap between the back-plate and the jaw-cover.

U.S. Pat. No. 6,135,502 issued to Howe et al. on Oct. 24, 2000, outlines a replaceable mud-flap system, which includes a rigid sleeve having a bottom face with a slot formed therein. The sleeve includes a hollow interior with a rectangular cross-section. An inboard end of the sleeve is perpendicularly coupled to a frame of a truck rearwardly of one of the tires thereof. An open outboard end allows communication with the hollow interior of the sleeve. An elastomeric flexible planar flap has a rigid guide coupled along a length thereof.

U.S. Pat. No. 6,186,527 issued to Monhollen et al. on Feb. 13, 2001, outlines the use of a mud-flap retainer system that includes a mud-flap retainer member, a plurality of threaded studs extending substantially horizontally and rearward from the rear face of the mud-flap retainer member and positioned between the top and bottom ends of the mud-flap retainer member, a plurality of nuts sized for being threaded onto the threaded studs and a plurality of coupling shoes.

U.S. Pat. No. 6,443,492 issued to Barr et al. on Sep. 3, 2002, outlines the use of a mud-flap hanger that incorporates a tension spring within a mud-flap support member of the hangar, which can be tensioned from a location external of the support member. The mud-flap hanger includes a connector projecting from the support member threadedly connected to a tensioner nut, which is rotated to tension the spring. A stop on the connector engages an end of the support member to limit the tension that can be applied to the tension spring.

German Patent No. DE 3 644 394 granted to Moellenstaedt et al. on Jul. 7, 1988, outlines the use of an easy to install dirt deflector to a mudguard using a spring clip and a mating piece allocated thereto. The mating piece is designed as an angular piece, one leg of which reaches into a pocket of the dirt deflector and the other leg of which has a receptacle for one leg of the spring clip.

W.I.P.O. Pat. No. 97/24249 granted to Richardson on Jul. 10, 1997, outlines a mud-flap bracket assembly for a slider suspension which has a forward portion adapted to be fixedly secured to a shortened slider rail and a rearward portion adapted to be slidably mounted to a body rail. Mud-flaps are also suspended from the rearward portion.

European Pat. No. EP 0 791 526 granted to Jacks et al. on Jan. 30, 1997, outlines a wheel guard assembly with a mudguard with a mud-flap which is retractable into the mudguard. The mud-flap is slidingly connected to the mudguard and may be clamped to the mudguard at any desired height above the ground. The assembly permits the mud-flaps of a vehicle to be retracted when there is a risk of them being damaged by contact with the ground. The height of the mud-flap above the ground varies with the load a vehicle is carrying and can thus be adjusted to a desired level regardless of the load.

Although each of these patents and patent applications outline mud-flap devices and assemblies that are novel and useful, they can be time-consuming and difficult to install. What is really needed is a mud-flap assembly that is easy and quick to install. Such a mud-flap assembly would address a great demand in the marketplace and make it easier for persons installing the mud-flap assemblies to install them.

None of the above inventions and patents, taken either singly or in combination, is seen to describe the instant invention as claimed. Thus a bracket and mud-flap assembly solving the aforementioned problems is desired.

SUMMARY OF THE INVENTION

The invention is a bracket and mud-flap assembly for vehicles and heavy equipment with a generally planar rectangular backing, a perpendicular flange attached to and extending across the top edge of the generally planar rectangular backing and a bracket that is below the area of the top edge and having two ends, the bracket being triangular in cross-section and being raised on each end of the bracket forming a slot across the generally planar rectangular backing and the bracket. The generally planar and rectangular mud-flap itself has a raised triangle-shaped protrusion running across its width and can be pulled between and through the front facing of the generally planar and rectangular backing and the bracket until the raised triangle-shaped protrusion is received in the slot.

Accordingly, it is a principal object of the invention to provide a mud-flap assembly that is easy to install on a vehicle or piece of heavy equipment.

It is another object of the invention to provide a mud-flap assembly that can be quickly installed on a vehicle.

It is a further object of the invention to provide a mud-flap assembly that is easy to pullout if needed.

Still another object of the invention is to provide a mud-flap assembly that does not require any bolts or holes to be made on the mud-flap.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
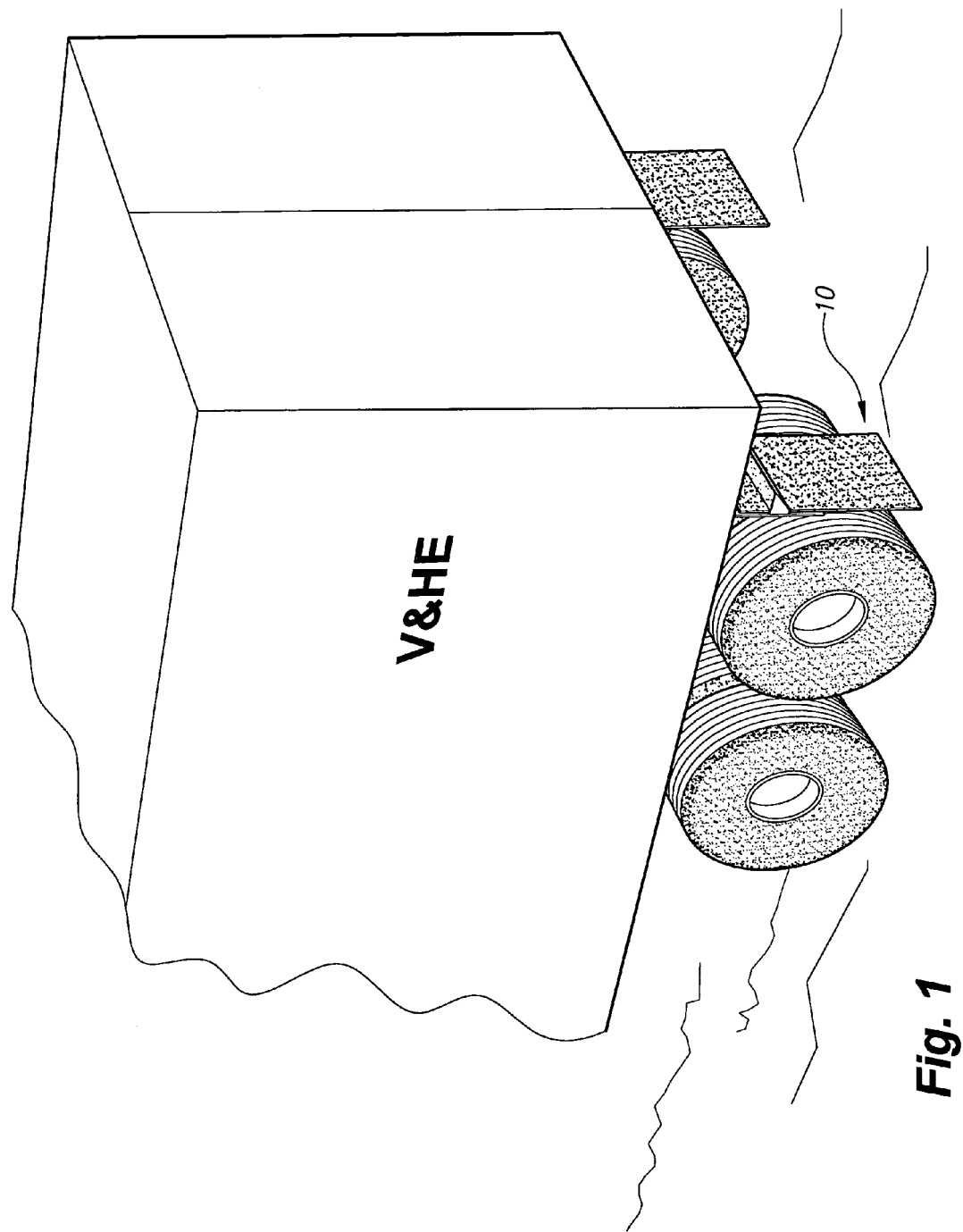
FIG. 1 is an environmental, perspective view of a bracket and mud-flap assembly according to the present invention.

The present invention is a bracket and mud-flap assembly 10 for vehicles and heavy equipment V&HE, as is shown in FIG. 1.

Figure 2:
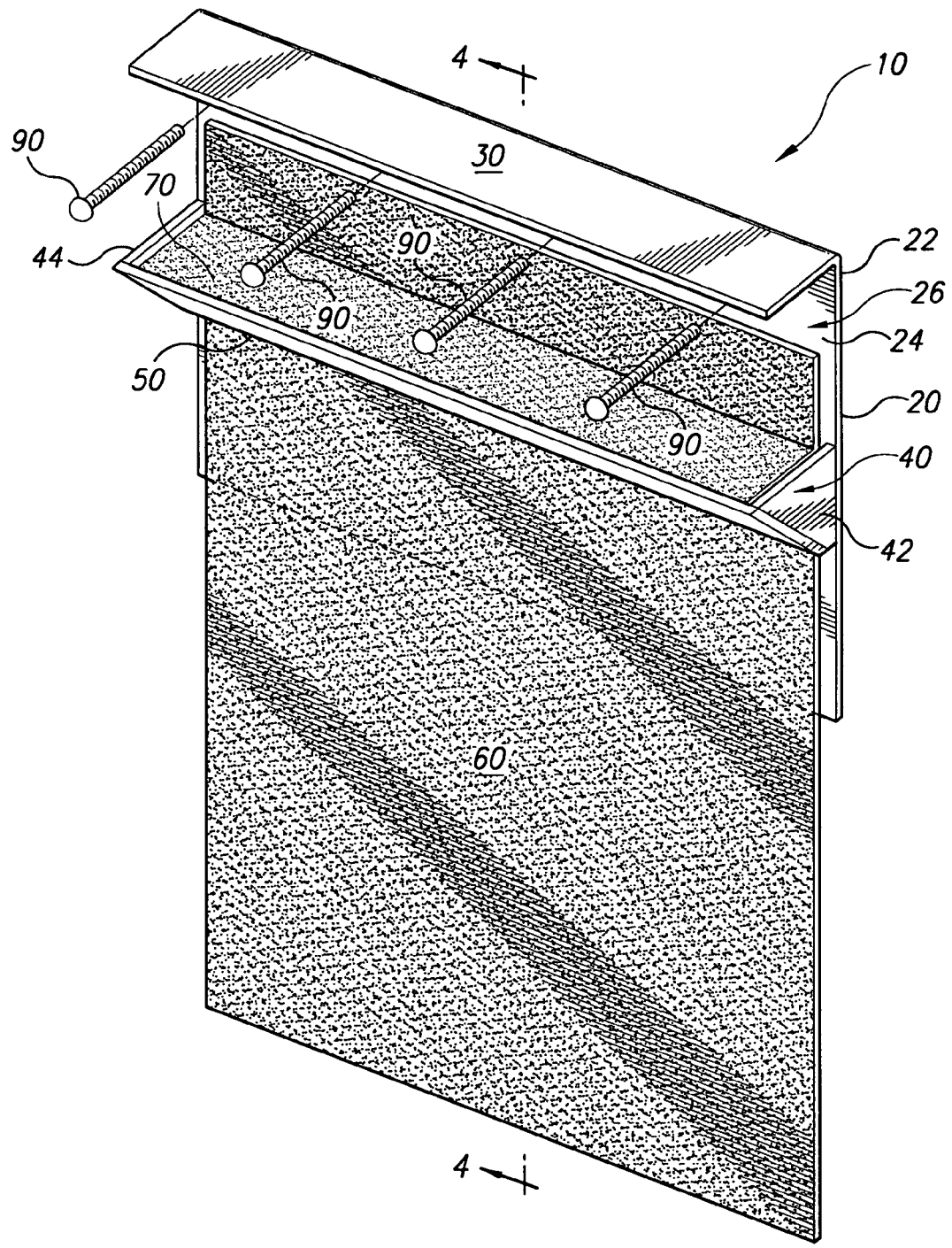
FIG. 2 is a front perspective view of the bracket and mud-flap assembly.
Figure 3:
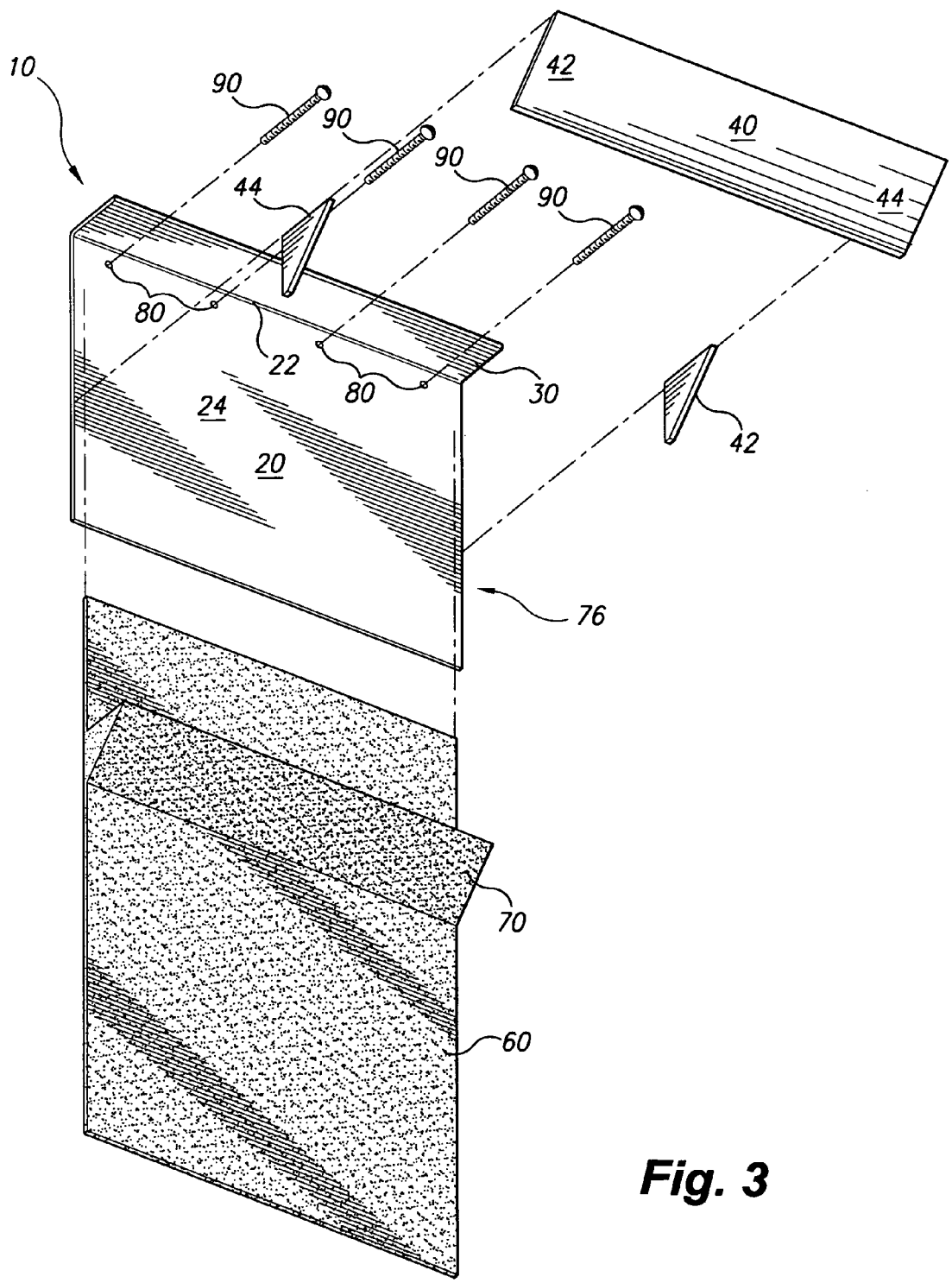
FIG. 3 is an exploded front-side perspective view of the bracket and mud-flap assembly.
Figure 4:
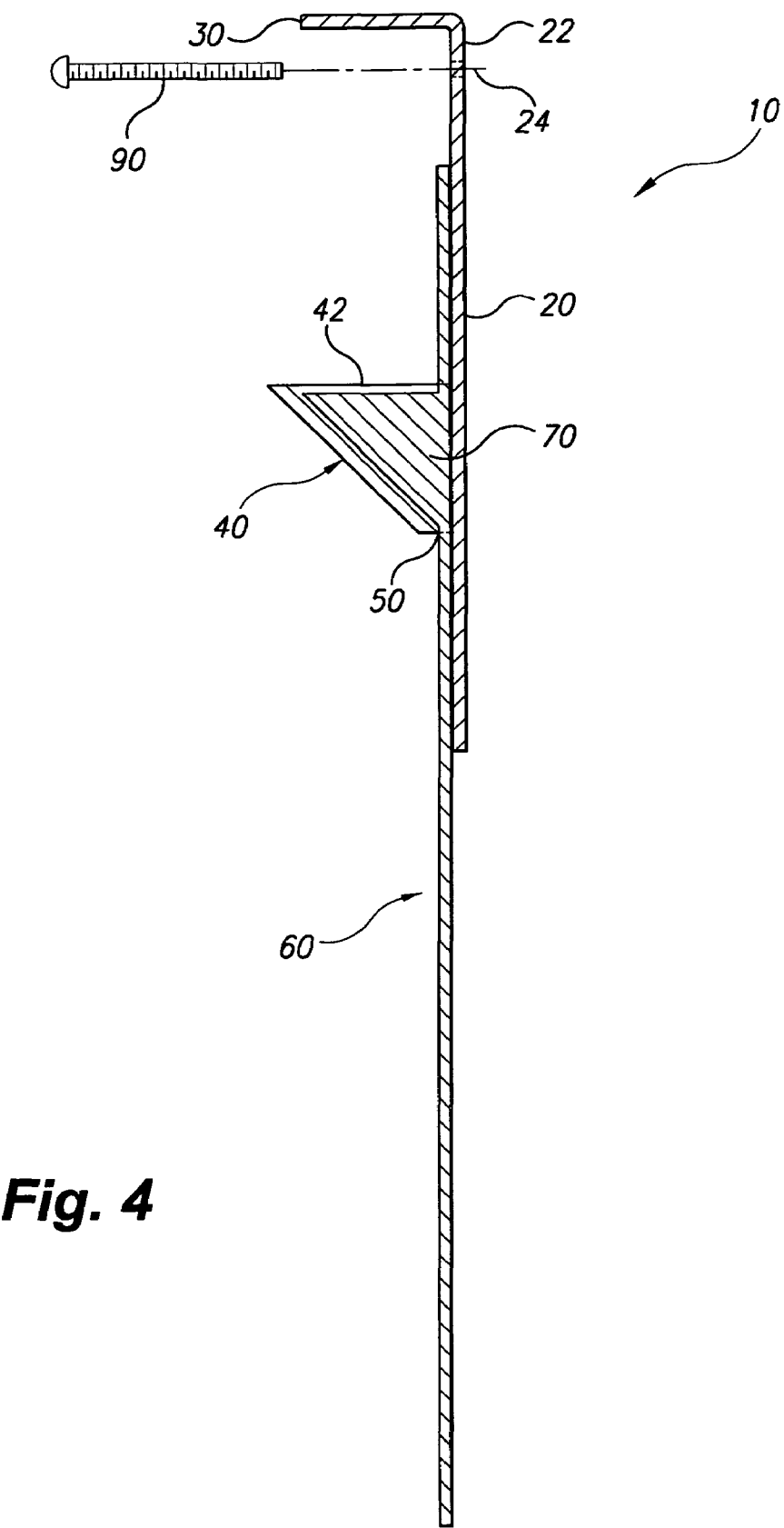
FIG. 4 is a side perspective view of the bracket and mud-flap assembly.

As depicted in FIG. 2, FIG. 3 and FIG. 4, the bracket and mud flap assembly 10 comprises a generally planar rectangular backing 20 with a top edge 22, an area below the top edge 24 and a front facing 26, a perpendicular flange 30 attached to and extending across the top edge 22 of the generally planar rectangular backing 20 and a bracket 40 that is below the area of the top edge 24 and having two ends 42,44, the bracket 40 being triangular in cross-section and being raised on each end 42,44 forming a slot 50 across the generally planar rectangular backing 20 and the bracket 40.

The bracket and mud flap assembly 10 further comprises a generally planar and rectangular mud-flap 60 with a width, a thickness and with a raised triangle-shaped protrusion 70 running across the width of the generally planar and rectangular mud-flap 60. The generally planar and rectangular mud-flap 60 can be pulled between and through the front facing 26 of the generally planar and rectangular backing 20 and the bracket 40 until the raised triangle-shaped protrusion 70 is received in the slot 50, leaving the area of the generally planar and rectangular mud-flap 60 below the raised triangle-shaped protrusion 70 to act as a secured mud-flap for the bracket and mud-flap assembly 10.

The bracket and mud flap assembly 10 also has a plurality of apertures 80 and corresponding bolts or screws 90 provided slightly below the perpendicular flange 30. The bracket 40 protrudes at a 45° to the generally planar rectangular backing 20. The slot 50 across the generally planar rectangular backing 20 and bracket 40 is greater than the thickness of the generally planar and rectangular mud-flap 60 to enable the generally planar and rectangular mud-flap 60 to be pulled through to the triangular-shaped protrusion 70. The slot 50 across the generally planar rectangular backing 20 is also greater than the width of the generally planar and rectangular mud-flap 60.

The perpendicular flange 30 keeps the raised triangle-shaped protrusion 70 running across the width of the generally planar and rectangular mud-flap 60 from coming out of the bracket 40. The generally planar and rectangular mud-flap 60 is manually placed in the bracket 40 and is manually removed from the bracket 40 as well. The bracket and mud-flap assembly 10 is designed to be easier to install than traditional mud-flap assemblies, which require a user to drill holes into the top of the mud-flap and bolt the mud-flap directly to a bar that extends behind each of the wheels of a standard truck or piece of heavy equipment. Note that with the bracket and mud-flap assembly 10, the user does not have to drill holes in the mud-flap itself but can instead simply slide the generally planar and rectangular mud-flap assembly 60 between the bracket 40 and the generally planar rectangular backing 20 and into the slot 50. The user would then pull down the generally planar and rectangular mud-flap 60 so that the raised triangle-shaped protrusion 70 fits down into the bracket 40.

Use of the bracket and mud-flap assembly 10 is straightforward. The generally planar rectangular backing 20 is attached to a standard bar (not shown) found behind the wheels on most vehicles and heavy equipment V+HE at a plurality of apertures 80 and with corresponding bolts or screws 90. Dimensions and sizes of the bracket and mud-flap assembly 10 and its components will vary based on the size of the tires and the vehicle and heavy equipment V+HE being added on to. Note that no apertures are needed to be made on the generally planar and rectangular mud-flap 60 itself, which saves a user from making apertures every time that the generally planar and rectangular mud-flap 60 needs to be replaced. The generally planar and rectangular mud-flap 60 can be simply slid into place as described earlier in this application. The generally planar rectangular backing 20, is made of sheet metal, as is the bracket 40 and the perpendicular flange 30 of the bracket and mud-flap assembly 10. The generally planar and rectangular mud-flap 60 of the bracket and mud-flap assembly 10, however, is made of durable rubberized material and is well-known to those that are schooled in the related art.

It is to be understood that the present invention is not limited to the embodiment described above, but encompasses any and all embodiments within the scope of the following claims.

We claim:

1. A bracket and mud-flap assembly for vehicles and heavy equipment, comprising:
    a generally planar rectangular backing with a top edge, an area below the top edge and a front facing;
    a perpendicular flange attached to and extending across the top edge of the generally planar rectangular backing;
    a bracket that is below the area of the top edge and having two ends, said bracket being triangular in cross-section and being raised on each end of the bracket forming a slot across the generally planar rectangular backing and the bracket;
    a generally planar and rectangular mud-flap with a width, a thickness and with a raised triangle-shaped protrusion running across the width of the generally planar and rectangular mud-flap, said generally planar and rectangular mud-flap can be pulled between and through the front facing of the generally planar and rectangular backing and the bracket until the raised triangle-shaped protrusion is received in the slot, leaving the area of the generally planar and rectangular mud-flap below the raised triangle-shaped protrusion to act as a secured mud-flap for the bracket and mud-flap assembly.

2. The assembly according to claim 1, wherein a plurality of apertures and corresponding bolts and screws are provided slightly below the perpendicular flange.

3. The assembly according to claim 1, wherein the bracket protrudes at a 45° to the generally planar rectangular backing.

4. The assembly according to claim 1, wherein the slot across the generally planar rectangular backing and bracket is greater than the thickness of the generally planar and rectangular mud-flap.

5. The assembly according to claim 1, wherein the slot across the generally planar rectangular backing is greater than the width of the generally planar and rectangular mud-flap.

6. The assembly according to claim 1, wherein the perpendicular flange keeps the raised triangle-shaped protrusion running across the width of the generally planar and rectangular mud-flap from coming out of the bracket.

7. The assembly according to claim 1, wherein the generally planar and rectangular mud-flap is manually placed in the bracket.

8. The assembly according to claim 1, wherein the generally planar and rectangular mud-flap is manually removed from the bracket.

9. The assembly according to claim 1, wherein the generally planar rectangular backing is made of sheet metal.

10. The assembly according to claim 1, wherein the generally planar and rectangular mud-flap is made of durable rubberized material.

11. The assembly according to claim 1, wherein the bracket is made of sheet metal.

12. The assembly according to claim 1, wherein the perpendicular flange is made of sheet metal.

\* \* \* \* \*